UNITED STATES PATENT OFFICE.

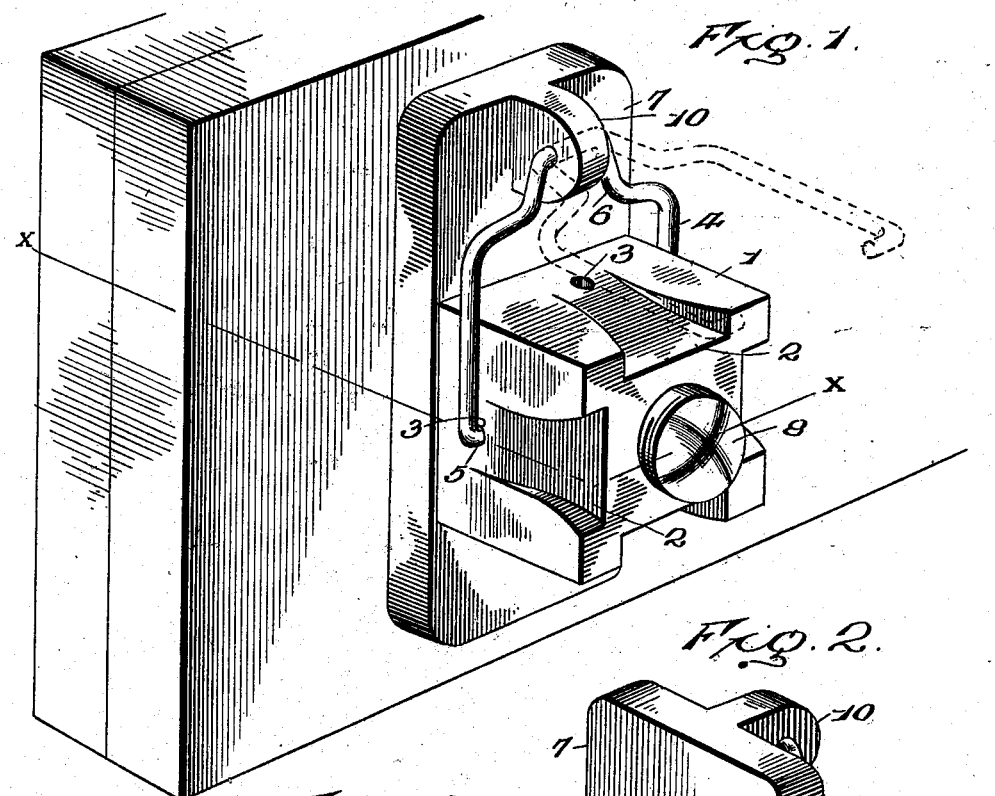
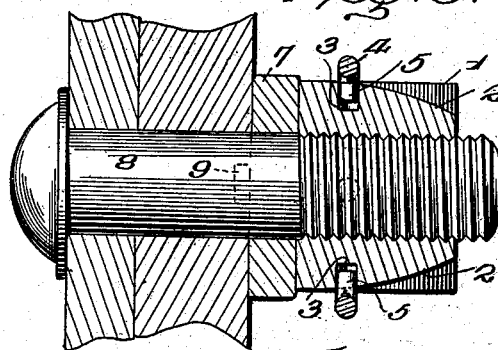
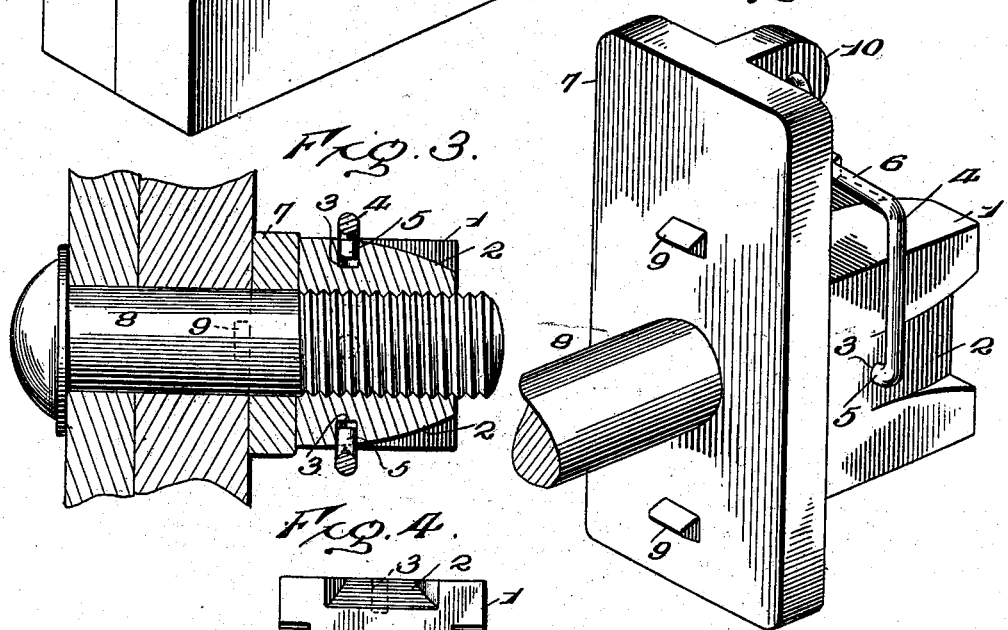
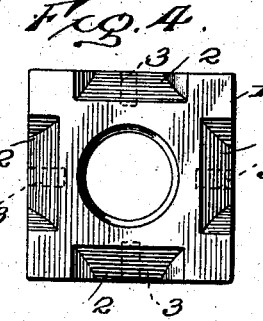

SEBASTIAN C. PUGH, OF NOTTINGHAM TOWNSHIP, HARRISON COUNTY, OHIO.

NUT-LOCK.

No. 900,202.      Specification of Letters Patent.      Patented Oct. 6, 1908.

Application filed February 15, 1908. Serial No. 416,066.

*To all whom it may concern:*

Be it known that I, SEBASTIAN C. PUGH, citizen of the United States, residing at Nottingham township, in the county of Harrison and State of Ohio, have invented certain new and useful Improvements in Nut-Locks, of which the following is a specification.

This invention appertains to means for preventing the loosening of such fastening means as nuts, burs, bolts or the like after being tightened, said means being of novel formation and particularly adapted for securing the nuts of bolts or like fastenings employed in railroad and bridge construction.

The invention contemplates a spring lock device of approximately U form and having pivotal connection with a plate or washer adapted to be interposed between the nut and the work and held from rotation, said lock device having inturned points to enter openings in opposite sides of the nut or like part to be secured.

The invention further consists of a nut or like part having oppositely inclined portions at opposite sides or faces for the inturned points of the lock device to ride upon so as to spread the members or legs of the said lock device, whereby said inturned points are enabled to spring into openings at the inner ends of the said inclined portions when reaching a position to register with said openings.

For a full understanding of the invention and the merits thereof and also to acquire a knowledge of the details of construction and the means for effecting the result, reference is to be had to the following description and accompanying drawings.

While the invention may be adapted to different forms and conditions by changes in the structure and minor details without departing from the spirit or essential features thereof, still the preferred embodiment is shown in the accompanying drawings, in which:

Figure 1 is a perspective view of a nut lock embodying the invention, the dotted lines showing the position of the lock device when turned aside to admit of tightening or loosening the nut or like part. Fig. 2 is a perspective view of the nut lock, looking from the rear. Fig. 3 is a horizontal section on the line $x$—$x$ of Fig. 1. Fig. 4 is a detail front view of the nut.

Corresponding and like parts are referred to in the following description and indicated in all the views of the drawings by the same reference characters.

The nut 1 may be of any construction and have any number of faces or edges and is provided at opposite points with inclined portions 2, the same converging towards the outer face of the nut so as to effect a spreading of the members or legs of the lock device when pressing the latter home. The inclined portions 2 flare towards their outer ends, whereby provision is had for the entrance of the inturned points of the lock device when moving the latter to an operative position. Openings 3 are provided at the inner ends of the inclined portions 2 to receive the inturned points of the lock device. The openings 3 may be of any depth and may lead into the bolt opening or terminate any required distance from the bolt opening. The lock device 4 is approximately of U-form and is constructed of spring wire of desired gage according to the special purpose for which the lock device is designed. The legs or side members of the spring lock device 4 are bent inward to form points 5 which are adapted to enter the openings 3 so as to prevent displacement of the parts when properly positioned. A crimp 6 is formed in the closed end of the lock device and provides a pivot attachment for the lock device and holds the same in place.

A washer or plate 7 is provided to slip upon the bolt or like part 8 and is adapted to be held from turning by any convenient means, such as a projection 9 upon its rear side and adapted to enter the part against which the washer may be placed. If the work be of wood, as in bridge construction, the projection 9 may be forced into the timber either by the blow of a hammer delivered upon the washer or plate, or by the action of the nut when screwing the same home upon the bolt 8. If the washer or plate be applied to a metal part, the latter will be provided in any manner with an opening or depression to receive the projection 9, as will be readily understood. The manner of securing the washer or plate from turning is immaterial within the scope of the invention. A lug 10 projects from the face of the washer or plate and is pierced to receive the lock device or the crimp 6 thereof. The sides of the crimp 6 embrace opposite sides of the lug 10 and prevent displacement of the lock device.

In practice, the washer or plate 7 with the spring lock device pivoted thereto in the manner set forth herein, is slipped upon the bolt or like part 8 and is prevented from turning. The nut 1 is screwed upon the threaded end of the bolt or kindred part 8 and serves to confine the washer or plate 7. After the nut has been screwed home tight upon the bolt and moved to a position to enable the inturned points 5 of the spring lock device to engage with and ride upon opposite inclined portions 2, the said lock device is moved from the position indicated by dotted lines in Fig. 1 to bring the said inturned points 5 in engagement with opposite inclined portions 2 and the side members of said lock devices are pressed inward to cause them to ride upon said inclined portions 2, which latter serve to spread the side members of the lock device and subject them to tension, when the inturned points 5 reach a position to register with the openings 3, they spring therein and are made secure. To release the spring lock device, it is necessary to force the side members apart to withdraw the inturned points 5 from the openings 3 when said lock device may be turned aside, as indicated by the dotted lines in Fig. 1, thereby admitting of the loosening or removal of the nut in the manner well understood.

Having thus described the invention, what is claimed as new is:

1. In a nut lock, the combination of a washer to be slipped upon the bolt, a spring lock device of approximately U-form having pivotal connection with said washer and having inturned points at the extremities of its side members, and a nut having openings in opposite edges and having inclined portions leading outward from said openings for the inturned points of the lock device to ride upon when pressing the same home.

2. In a nut lock, the combination of a washer or plate having a lug, a spring lock device of approximately U-form having a crimp at its closed end mounted in the said lug and embracing opposite sides thereof and having inturned points at the extremities of its side members, and a nut having inclined portions in opposite edges which converge outwardly and having openings at the inner ends of said inclined portions to receive the inturned points of the lock device.

3. A nut lock comprising a washer or plate having an interlocking projection upon its rear side and provided with a lug upon its face, a spring lock device of U-form having inturned points at the extremities of its side members and having a crimp in its closed end which is mounted in the aforementioned lug and embraces opposite sides thereof, and a nut having inclined portions at opposite edges which converge and flare outwardly, and having openings at the inner ends of said inclined portions to receive the inturned points of the lock device.

In testimony whereof I affix my signature in presence of two witnesses.

SEBASTIAN C. PUGH. [L. S.]

Witnesses:
ISAAC S. COPE,
GAY. S. ROGERS.